(12) United States Patent
Kobayashi

(10) Patent No.: US 11,806,792 B2
(45) Date of Patent: Nov. 7, 2023

(54) CUTTING TOOL AND METHOD FOR MANUFACTURING MACHINED PRODUCT

(71) Applicant: KYOCERA Corporation, Kyoto (JP)

(72) Inventor: Youji Kobayashi, Yasu (JP)

(73) Assignee: KYOCERA Corporation, Kyoto (JP)

( * ) Notice: Subject to any disclaimer, the term of this patent is extended or adjusted under 35 U.S.C. 154(b) by 292 days.

(21) Appl. No.: 16/766,022

(22) PCT Filed: Nov. 19, 2018

(86) PCT No.: PCT/JP2018/042676
§ 371 (c)(1),
(2) Date: May 21, 2020

(87) PCT Pub. No.: WO2019/107204
PCT Pub. Date: Jun. 6, 2019

(65) Prior Publication Data
US 2020/0361004 A1    Nov. 19, 2020

(30) Foreign Application Priority Data
Nov. 28, 2017 (JP) .................. 2017-227793

(51) Int. Cl.
*B23B 27/10* (2006.01)
*B23Q 11/00* (2006.01)
(Continued)

(52) U.S. Cl.
CPC ............ *B23B 27/1614* (2013.01); *B23B 1/00* (2013.01); *B23Q 11/10* (2013.01); *B23B 27/10* (2013.01)

(58) Field of Classification Search
CPC ...... B23B 27/10; B23B 2250/12; B23B 27/04; B23B 27/045; B23B 27/005;
(Continued)

(56) References Cited

U.S. PATENT DOCUMENTS 11,154,936 B2 * 10/2021 Kobayashi ............. B23B 29/12
11,370,032 B2 *  6/2022 Ando ..................... B23B 27/10
(Continued)

FOREIGN PATENT DOCUMENTS

JP    54-001475 A    1/1979
JP   2007-185765 A   7/2007
(Continued)

OTHER PUBLICATIONS

WO2017018369 (translation) obtained at https://worldwide.espacenet.com/patent/search/family/057885122/publication/WO2017018369A1?q=pn%3DWO2017018369A1 (last visited Dec. 2, 2021). (Year: 2017).*

*Primary Examiner* — Sara Addisu
(74) *Attorney, Agent, or Firm* — Volpe Koenig

(57) ABSTRACT

A cutting tool may include a holder extended along a central axis from a first end to a second end and including a pocket, and a cutting insert located in the pocket. The holder may further include an upper surface, a lower surface, a first end surface, a first side surface, a recess, a first flow path and a second flow path. The recess opens into the first end surface and the first side surface. The first flow path is located along the central axis. The second flow path is located closer to the upper surface than the recess and connects to the first flow path. An imaginary plane that passes through the central axis and is orthogonal to the lower surface is a reference plane. The pocket opens into the recess and is recessed from the recess toward the reference plane.

18 Claims, 12 Drawing Sheets

(51) Int. Cl.
*B23B 27/16* (2006.01)
*B23B 1/00* (2006.01)
*B23Q 11/10* (2006.01)

(58) Field of Classification Search
CPC ..... B23B 29/043; B23B 29/04; B23B 29/046; B23B 29/06; B23B 29/08; B23B 29/10; B23B 29/12; B23B 29/14; B23B 2210/12; B23B 2210/126; B23B 2270/30; B23B 27/16; B23B 2220/123; B23B 27/007; B23Q 11/1046; B23Q 11/10
See application file for complete search history.

(56) References Cited

U.S. PATENT DOCUMENTS

| | | | |
|---|---|---|---|
| 2007/0183856 A1 | 8/2007 | Jansson | |
| 2014/0030033 A1* | 1/2014 | Luik | B23B 29/043 407/11 |
| 2014/0356082 A1* | 12/2014 | Smith | B23B 27/10 407/11 |
| 2017/0341152 A1* | 11/2017 | Ida | B23B 27/14 |
| 2018/0318935 A1 | 11/2018 | Kobayashi et al. | |
| 2019/0015904 A1* | 1/2019 | Kobayashi | B23Q 11/1046 |
| 2020/0038962 A1* | 2/2020 | Kobayashi | B23B 27/10 |
| 2021/0260668 A1* | 8/2021 | Henger | B23B 27/045 |

FOREIGN PATENT DOCUMENTS

| | | | | |
|---|---|---|---|---|
| JP | 2016-055360 A | 4/2016 | | |
| WO | 2017/018369 A1 | 2/2017 | | |
| WO | WO-2017110903 A1 * | 6/2017 | ............. | B23B 27/10 |

* cited by examiner

CUTTING TOOL AND METHOD FOR MANUFACTURING MACHINED PRODUCT

CROSS-REFERENCE TO RELATED APPLICATIONS

This application is a national stage entry according to 35 U.S.C. 371 of PCT Application No. PCT/JP2018/042676, filed on Nov. 19, 2018, which claims priority to Japanese Application No. 2017-227793, filed Nov. 30, 2017, which is entirely incorporated herein by reference.

TECHNICAL FIELD

The present disclosure generally relates to cutting inserts for use in a cutting process and, more specifically, to cutting tools for use in a turning process, such as a grooving process.

BACKGROUND

For example, a cutting tool is discussed in Japanese Unexamined Patent Publication No. 2016-55360 (Patent Document 1) as a cutting tool for use in a grooving process of a workpiece, such as metal. Patent Document 1 discusses the cutting tool including a cutting insert and a holder. The cutting insert may include a cutting edge and a rake surface. The holder may include an insert fixing part that permits fixing of the cutting insert, and an injection port for coolant. The injection port may be located behind the rake surface and may open toward the cutting edge. The coolant injected from the injection port may be injectable toward the cutting edge of the cutting insert.

SUMMARY

A cutting tool in a non-limiting embodiment may have a bar shape extended from a first end to a second end and may include a holder and a cutting insert. The holder may include a pocket. The holder may include an upper surface, a lower surface, a first end surface, a first side surface, a recess, a first flow path, a second flow path and the pocket. The lower surface may be located on a side opposite to the upper surface. The first end surface may be located between the upper surface and the lower surface and located on a side of the first end. The first side surface may be located between the upper surface and the lower surface and located from the first end to the second end. The recess may open into the first end surface and the first side surface. The first flow path may be located along a central axis of the holder and may include an inflow port. The second flow path may be located closer to the upper surface than the recess, connects to the first flow path, and may include an outflow port. The cutting insert may be located in the pocket. An imaginary plane orthogonal to the lower surface may be a reference plane. The pocket may open into the recess and may be recessed from the recess toward the reference plane.

DETAILED DESCRIPTION

Figure 1:
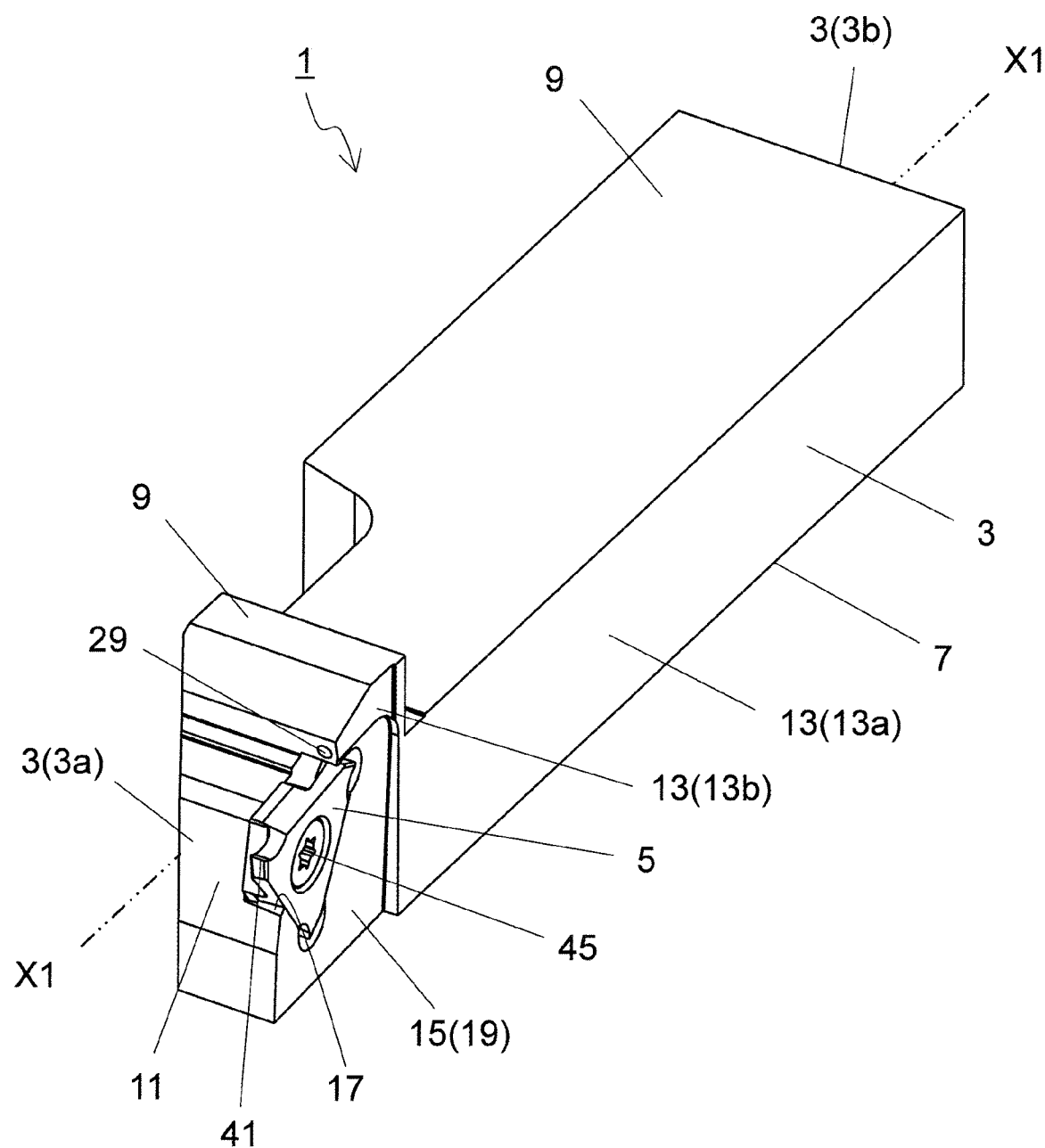
FIG. 1 is a perspective view illustrating a cutting tool in a non-limiting embodiment.
Figure 2:
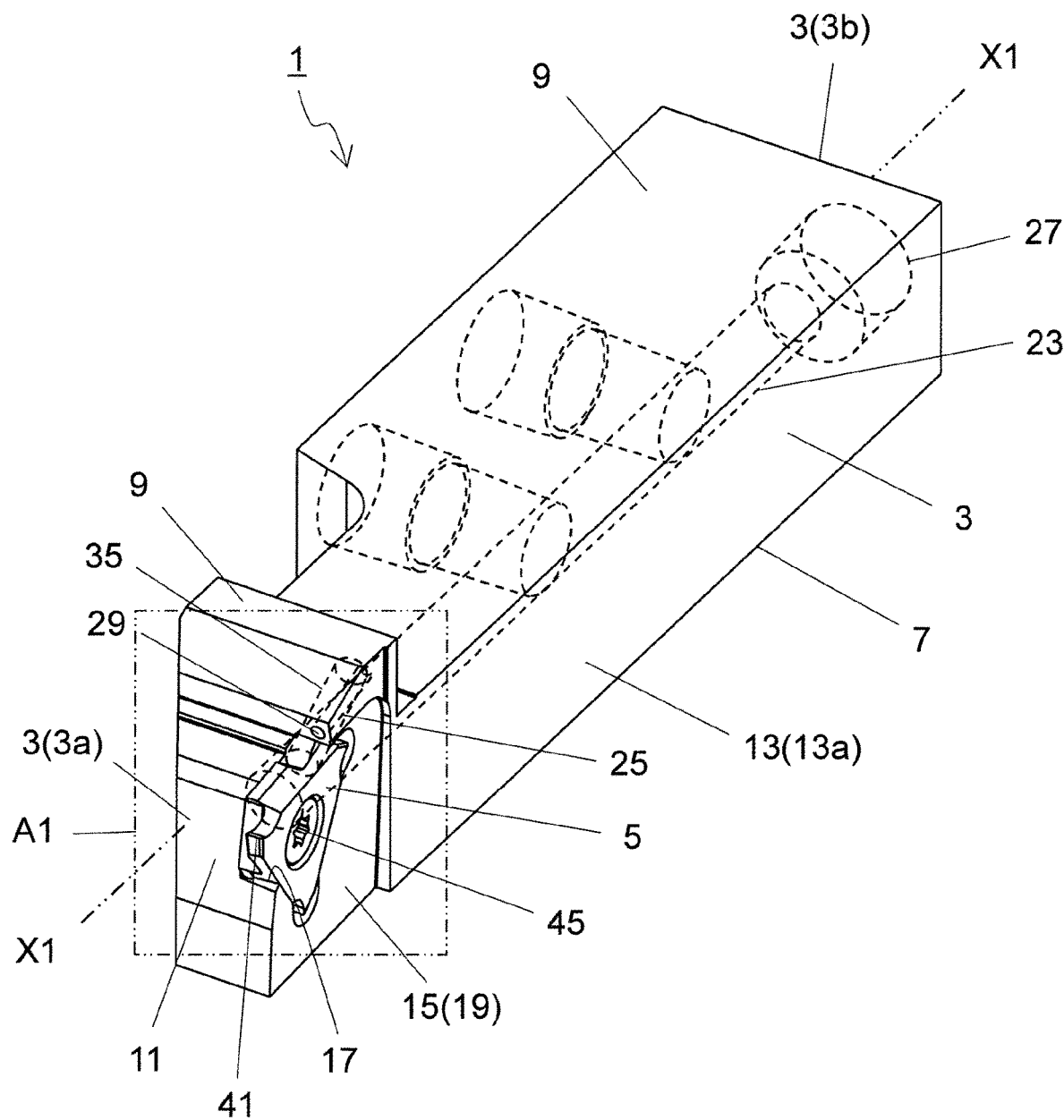
FIG. 2 is a perspective view of a flow path in the cutting tool illustrated in FIG. 1.

In recent years, there has been a demand for enhanced injection pressure for coolant in order to increase cooling efficiency. However, a thickness between a flow path that permits passage of the coolant and a side surface on a side of a chip fixing part may be small in the cutting tool described in Patent Document 1. It may be therefore difficult to cope with the demand.

Cutting tools 1 in non-limiting embodiments may be described in detail below with reference to the drawings. For the sake of description, each of the drawings referred to in the following may illustrate, in a simplified form, only main members necessary for describing the non-limiting embodiments. The cutting tools disclosed below may therefore be capable of including any arbitrary structural member not illustrated in the drawings referred to. Dimensions of the members in each of the drawings may be ones which faithfully represent neither dimensions of actual structural members nor dimension ratios of these members.

<Cutting Tools>

The cutting tool 1 in the disclosure may include a holder 3 and a cutting insert 5 (hereinafter also simply referred to as "the insert 5"). The holder 3 may have a bar shape extended along a central axis X1 from a first end 3a to a second end 3b as illustrated in FIG. 1. In general, the first end 3a may be called "a front end" and the second end 3b may be called "a rear end."

The holder 3 may have, for example, an approximately quadrangular prism shape as illustrated in FIG. 1, or a columnar shape. The holder 3 may be formed by one or a plurality of members.

The holder 3 may include a lower surface 7, an upper surface 9, a first end surface 11, a first side surface 13, a recess 15 and a pocket 17 in the present disclosure. As illustrated in FIG. 1, the lower surface 7 may be located from the first end 3a to the second end 3b and formed by one flat surface. The lower surface 7 may be located on a side opposite to the upper surface 9 in the non-limiting embodiment illustrated in FIG. 1.

The upper surface 9 may be formed by one or a plurality of flat surfaces. The upper surface 9 may be formed by the plurality of flat surfaces in the non-limiting embodiment illustrated in FIG. 1, and these flat surfaces may be individually parallel to the lower surface 7.

The first end surface 11, the first side surface 13 and the recess 15 may be individually located between the lower surface 7 and the upper surface 9 in the non-limiting embodiment illustrated in FIG. 1. The first end surface 11 may be located on a side of the first end 3a. The first side surface 13 may be located from the first end 3a to the second end 3b.

Figure 6:
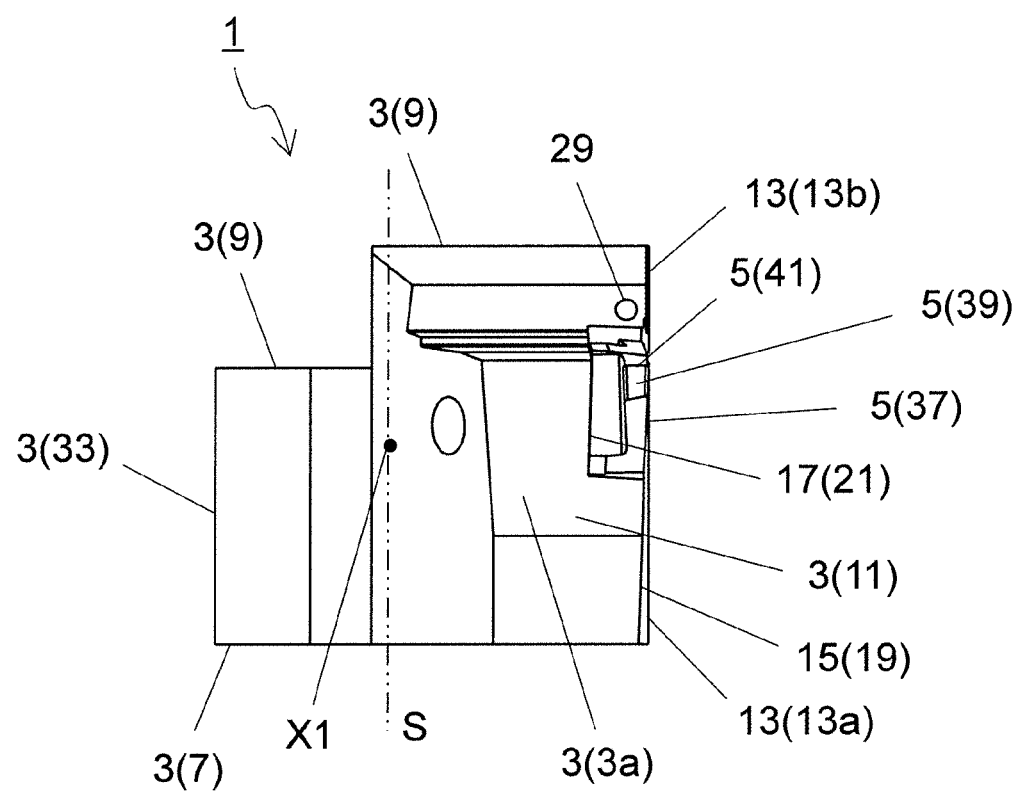
FIG. 6 is a side view of the cutting tool illustrated in FIG. 4 as viewed from a B1 direction.

The central axis X1 of the holder 3 can be defined in the following procedure. Firstly, the first end surface 11 in the cutting tool 1 may be firstly viewed from the front as illustrated in FIG. 6. Then, a point which is a midportion in a direction orthogonal to the lower surface 7 of the holder 3 (a vertical direction in FIG. 6) and which is a midportion in a direction parallel to the lower surface 7 of the holder 3 (a lateral direction in FIG. 6) may be regarded as a center of the first end surface 11. An imaginary line that passes through the center of the first end surface 11 and is parallel to the lower surface 7 and the first side surface 13 may be regarded as the central axis X1.

The recess 15 may be located on a side of the first end 3a in the holder 3, and may open into, for example, the first end surface 11 and the first side surface 13 as illustrated in FIG. 1. In other words, a part of the holder 3 may be recessed on the side of the first end 3a, and the part thus recessed may correspond to the recess 15. The recess 15 may open into the lower surface 7 as illustrated in FIG. 1.

The recess 15 is not limited to a specific configuration. For example, as illustrated in FIG. 1, the recess 15 may include a first surface approximately parallel to the lower surface 7, a second surface approximately parallel to the first end surface 11, and a third surface that is approximately flat and parallel to the first side surface 13. The third surface may be larger than the first surface and the second surface in the non-limiting embodiment illustrated in FIG. 1. In the following description, the third surface may therefore be referred to as a first bottom surface 19 for the sake of convenience.

The holder 3 may include a pocket 17 in the present disclosure. The pocket 17 may be a portion at which the insert 5 is located upon attachment of the insert 5 to the holder 3. Although the pocket 17 is not limited to a specific configuration, the pocket 17 may have a configuration corresponding to a shape of the insert 5 in order to stably fix the insert 5 to the holder 3.

In the following description, an imaginary plane that passes through the central axis X1 and is orthogonal to the lower surface 7 may be a reference plane S.

The pocket 17 may open into the recess 15 and may be recessed from the recess 15 toward the reference plane S. In this case, the pocket 17 may open into the first bottom surface 19 in the recess 15 as illustrated in FIG. 1. The pocket 17 may be located on a side of the first end 3a in the holder 3. Alternatively, the pocket 17 may open into the first end surface 11.

A part of the first bottom surface 19 may be formed in a recess configuration and a recess portion may correspond to the pocket 17 in the non-limiting embodiment illustrated in FIG. 1. The pocket 17 illustrated in FIG. 1 may include a surface approximately parallel to the first side surface 13. In the following description, a surface approximately parallel to the first side surface 13 in the pocket 17 may be referred to as a second bottom surface 21 for the sake of convenience.

The holder 3 may include a first flow path 23 and a second flow path 25 in the present disclosure. The first flow path 23 and the second flow path 25 may be located in the holder 3. The first flow path 23 and the second flow path 25 may be capable of serving as a part that permits flow of the coolant during use of the cutting tool 1. The first flow path 23 may be located along the central axis X1 and may include a coolant inflow port 27. The first flow path 23 may be extended in a straight line shape in parallel to the central axis X1, and may be located from the second end 3b toward the first end 3a in the holder 3 in the non-limiting embodiment illustrated in FIG. 5.

Figure 5:
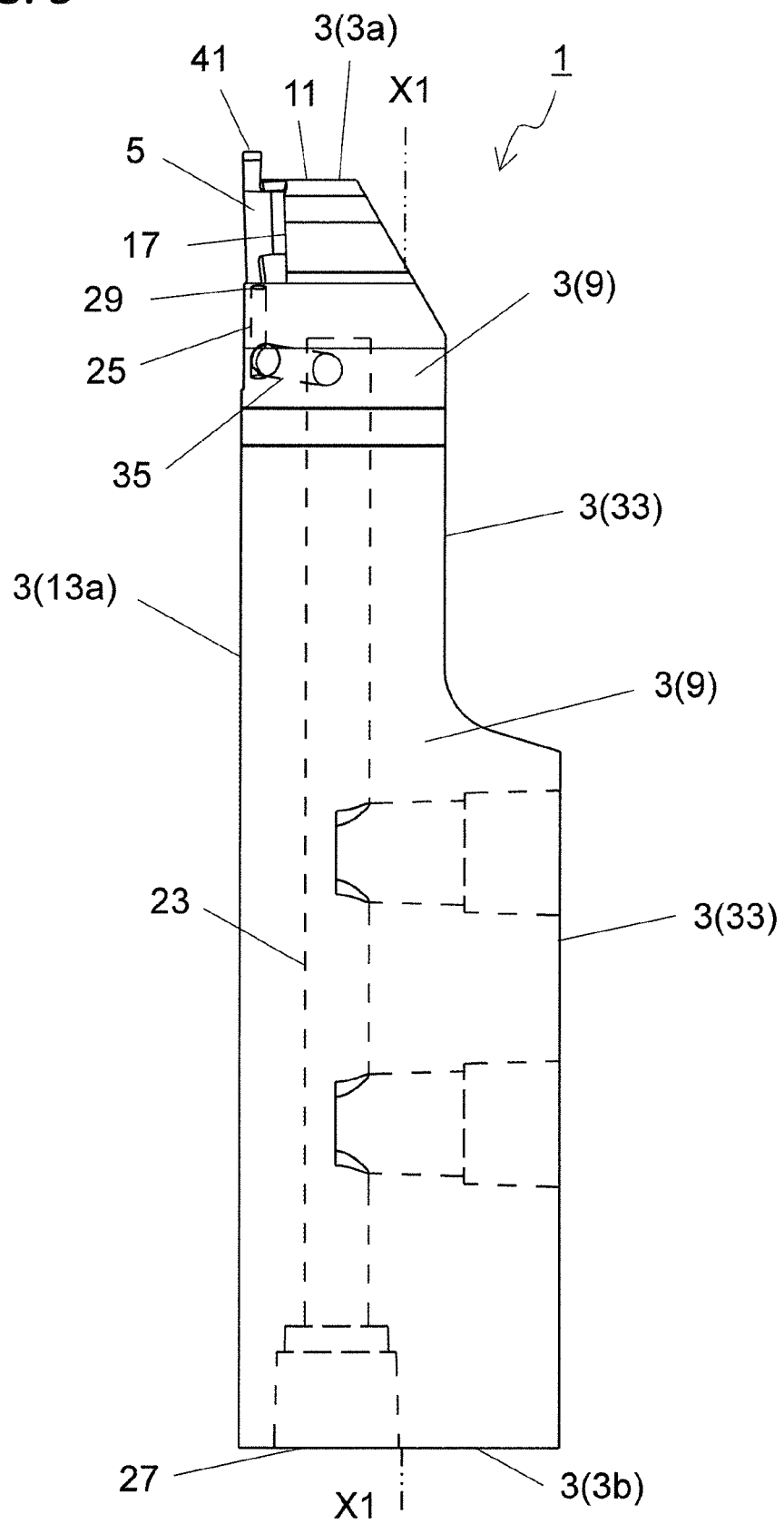
FIG. 5 is a perspective view of a flow path in the cutting tool illustrated in FIG. 4.

The coolant inflow port 27 may be located in an end surface on a side of the second end 3b in the holder 3 in the non-limiting embodiment illustrated in FIG. 5. The end surface on the side of the second end 3b in the holder 3 may be referred to as a second end surface 31. A position of the coolant inflow port 27 is not limited to the second end surface 31, but may be located on a side surface located on a side opposite to the first side surface 13 in the holder 3 (hereinafter also referred to as a second side surface 33) or alternatively on the upper surface 9.

Figure 9:
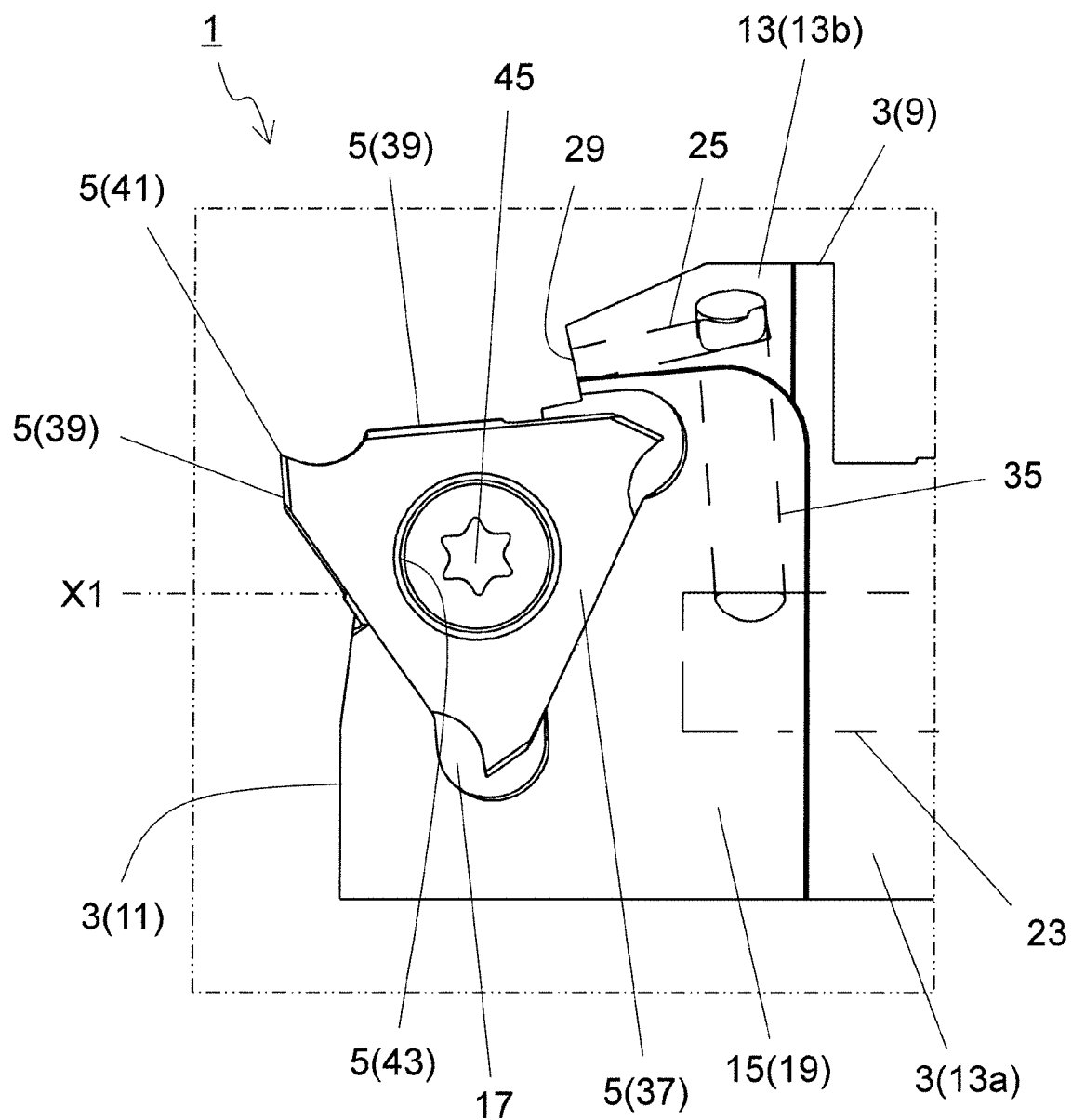
FIG. 9 is an enlarged view of a region A2 illustrated in FIG. 8.

The second flow path 25 may be located closer to the upper surface 9 than the recess 15 and may include a coolant outflow port 29 in the non-limiting embodiment illustrated in FIG. 9. The second flow path 25 may be located closer to the first end 3a in the holder 3 than the first flow path 23 and may be extended in a straight line shape along the central axis X1 in the non-limiting embodiment illustrated in FIG. 5. The second flow path 25 may be located closer to the central axis X than the first bottom surface 19 of the recess 15 in a top view. The second flow path 25 may connect to the first flow path 23. The coolant supplied from the inflow port 27 of the first flow path 23 may be supplied through the first flow path 23 to the second flow path 25. The coolant supplied to the second flow path 25 may be ejected outward from the outflow port 29 of the second flow path 25.

The coolant may be ejected toward the insert 5 from the outflow port 29 of the second flow path 25. It may be possible to cool the insert 5 in cases where the coolant is ejected toward the insert 5. Alternatively, the coolant may be ejected toward chips from the outflow port 29 of the second flow path 25. Enhanced chip discharge performance may be attainable in cases where the coolant is ejected toward the chips.

The second flow path 25 may directly connect to the first flow path 23, or alternatively may connect to the first flow path 23 with a different flow path interposed therebetween. The second flow path 25 may connect to the first flow path 23 with a third flow path 35 interposed therebetween in the non-limiting embodiment illustrated in FIG. 3. The third flow path 35 may connect an end portion on a side of the first end 3a in the first flow path 23 and an end portion on a side of the second end 3b in the second flow path 25 in the non-limiting embodiment illustrated in FIG. 3.

The outflow port 29 may be located immediately above the insert 5. That is, the outflow port 29 may be located so as to be overlapped with the insert 5 in a front view from a side of the upper surface 9 as illustrated in FIG. 5. It may be easy to eject the coolant toward the insert 5 if the outflow port 29 is located immediately above the insert 5.

The coolant may be composed of, for example, water-insoluble cutting fluid or water-soluble cutting fluid, and may be usable by being suitably selected according to a material of a workpiece. Examples of the water-insoluble cutting fluid may include oil-based cutting fluids, inert extreme pressure-based cutting fluids and active extreme pressure-based cutting fluids. Examples of the water-soluble cutting fluid may include emulsion-type, soluble-type and solution-type cutting fluids. Alternatively, the coolant may be gases, such as inert gas, instead of fluid ones.

Shapes of the flow paths (the first flow path 23, the second flow path 25 and the third flow path 35) are not particularly limited as long as it is possible to permit passage of the coolant. The first flow path 23, the second flow path 25 and the third flow path 35 may have a circular shape in terms of shape of a cross section orthogonal to a coolant flow direction in the non-limiting embodiment. For example, the shapes of the flow paths in the above cross section may be an elliptical shape or a polygonal shape. The flow paths may have an inner diameter of, for example, 1-10 mm.

The flow paths can be formed by carrying out a hole drilling of a member that serves as the main body 3 with the use of a drill or the like. A part of a hole part formed by the hole drilling, which does not serve as the flow path, may be closed by a seal member (not illustrated) in order to avoid leakage of the coolant. Examples of the seal member may include solder, resin members and screw members.

For example, steel, cast iron, and aluminum alloy may be usable as a member that forms the holder 3. Dimensions of the holder 3 may be suitably set according to dimensions of a workpiece. A length of the holder 3 in a direction along the central axis X1 may be settable to, for example, approximately 60-200 mm. A width thereof in a direction orthogonal to the central axis X1 may be settable to, for example, approximately 6-50 mm.

Figure 3:
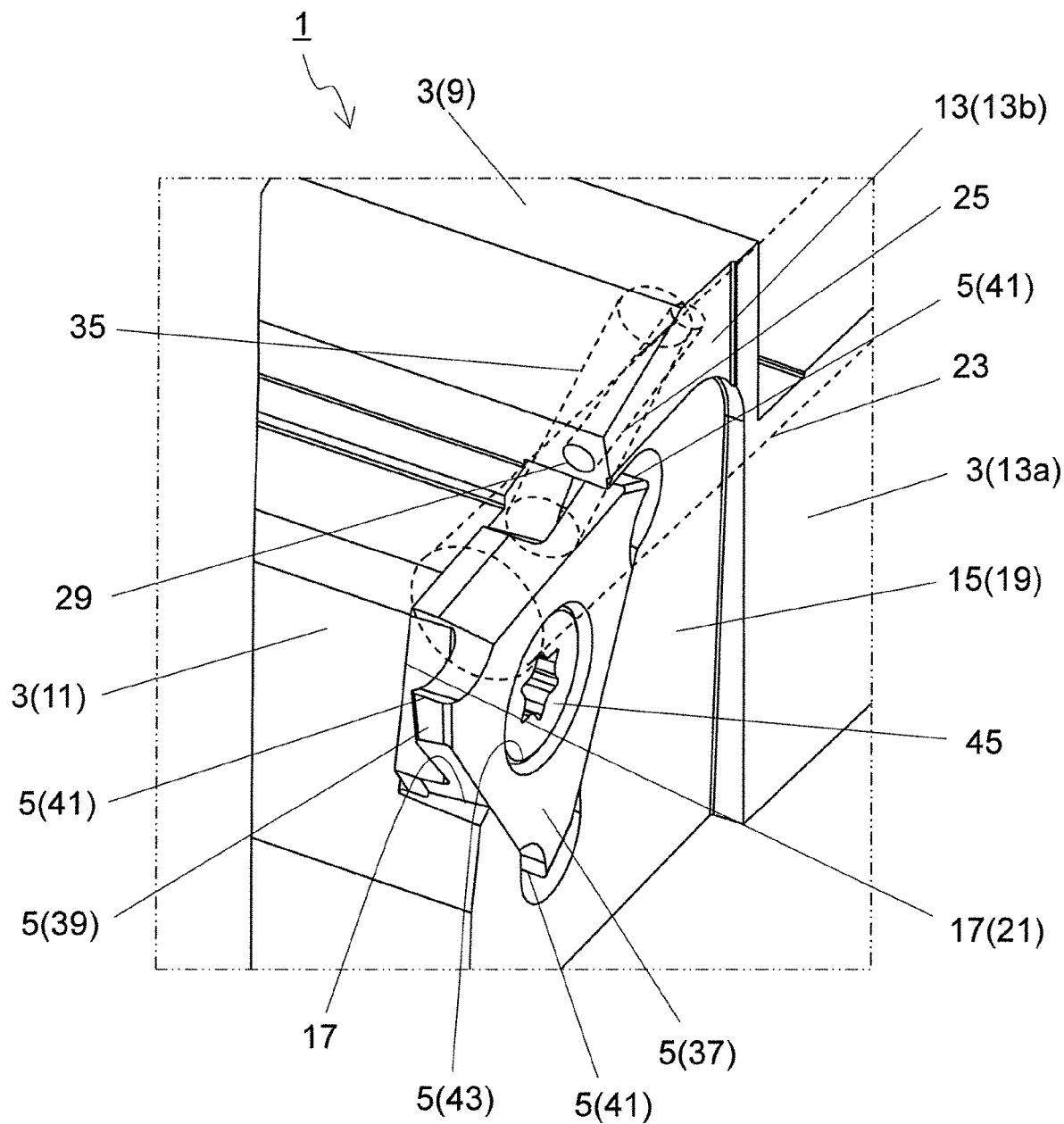
FIG. 3 is an enlarged view of a region A1 illustrated in FIG. 2.
Figure 4:
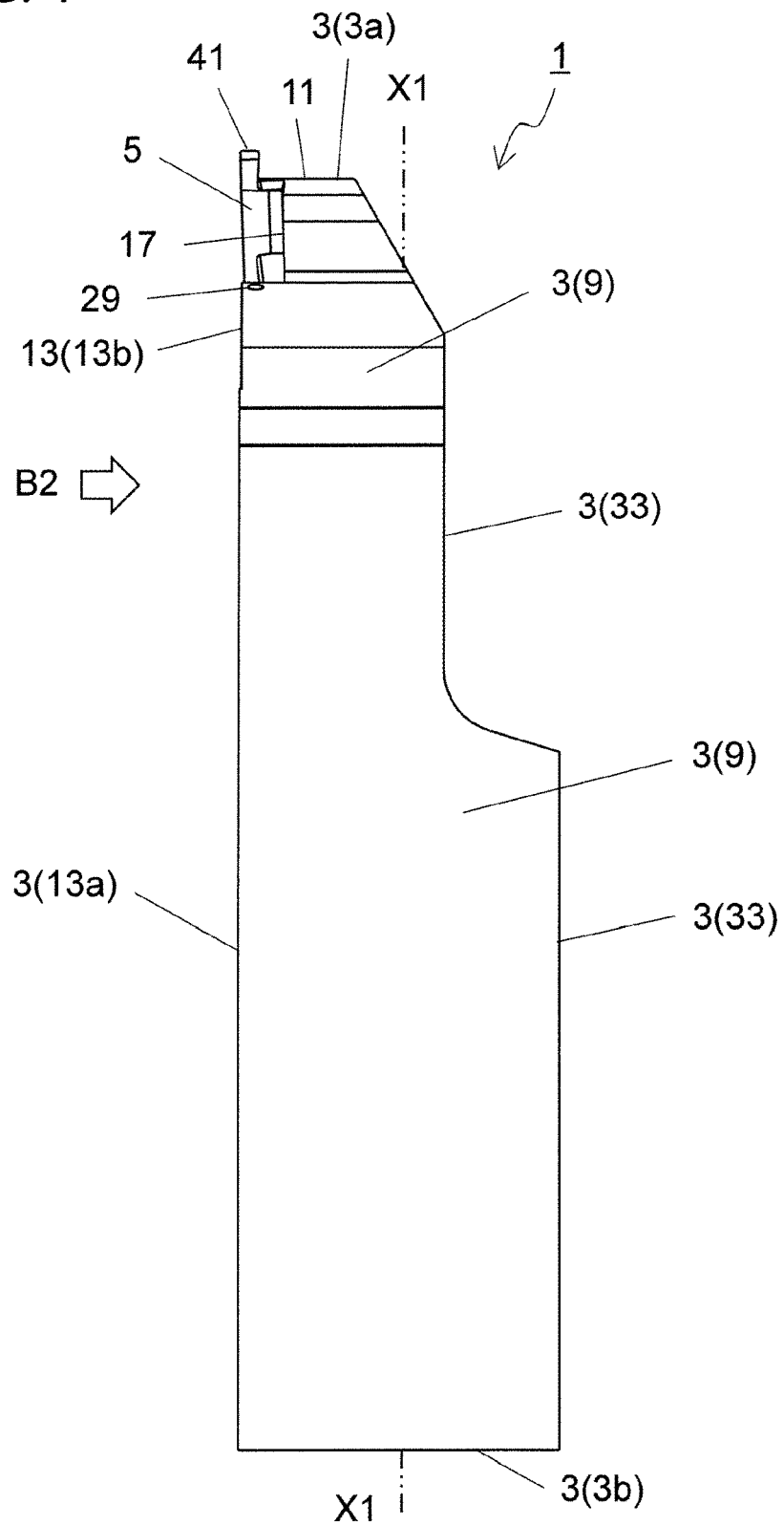
FIG. 4 is a front view of an upper surface in the cutting tool illustrated in FIG. 1.

The insert 5 may be located in the pocket 17 in the present disclosure. The insert 5 may be fixed to the holder 3 by a fixing member 45 as illustrated in FIG. 3. The insert 5 may have a flat plate shape including a pair of end surfaces 37 and a plurality of side surfaces 39 located between the pair of end surfaces 37 as illustrated in FIG. 3. The pair of end surfaces 37 may individually have a polygonal shape, specifically, a triangular shape in the non-limiting embodiment illustrated in FIG. 3. The insert 5 may be located in the pocket 17 so that one of the pair of end surfaces 37 is in contact with the second bottom surface 21 in the pocket 17.

The insert 5 may include a cutting edge 41 in the present disclosure. The cutting edge 41 may be located on at least a part of an intersection of a plurality of side surface 39 as illustrated in FIG. 3. A cutting process can be carried out by bringing the cutting edge 41 into contact with a workpiece. The insert 5 may include one or a plurality of cutting edges 41. The insert 5 may include three cutting edges 41 in the non-limiting embodiment illustrated in FIG. 3. If the insert 5 includes the plurality of cutting edges 41, any one of the cutting edges 41 may be used in a single cutting process.

Figure 7:
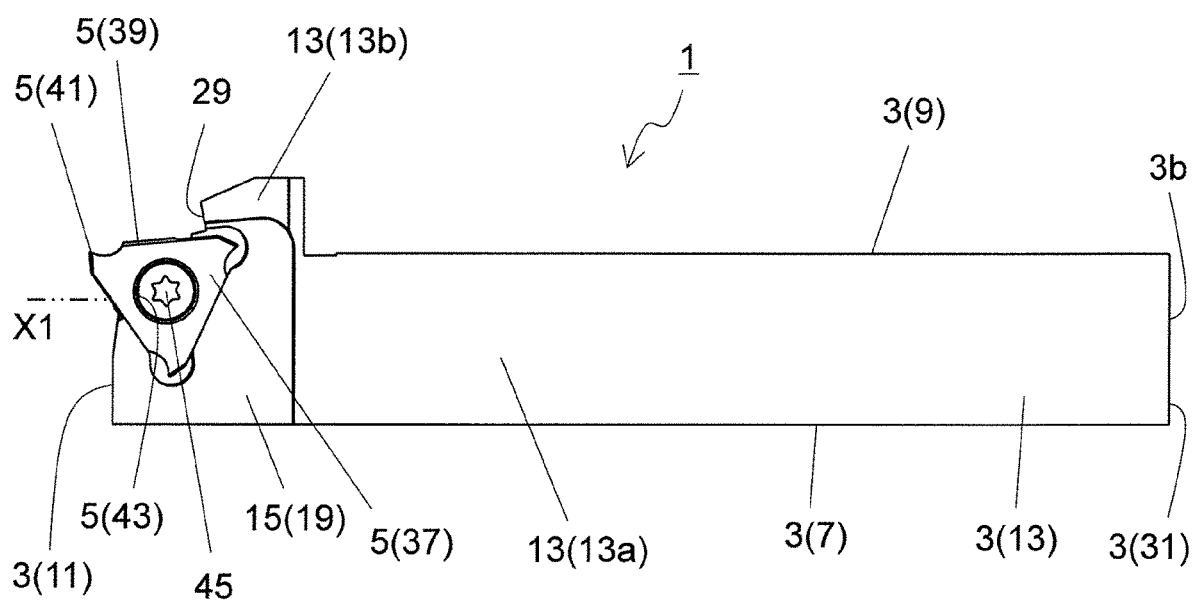
FIG. 7 is a side view of the cutting tool illustrated in FIG. 4 as viewed from a B2 direction.
Figure 8:
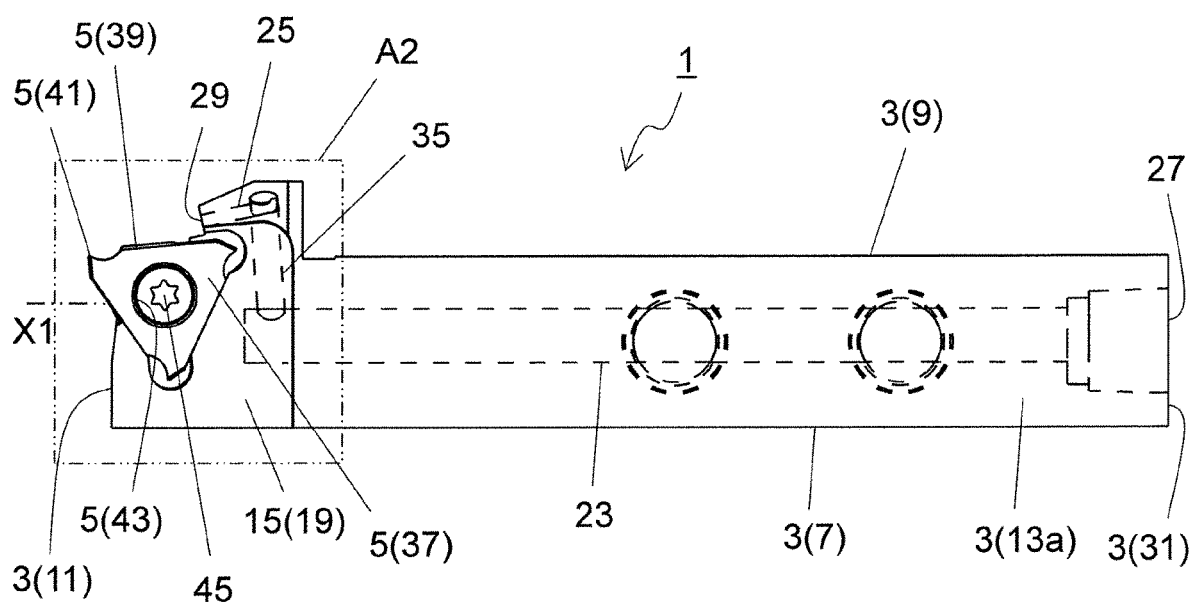
FIG. 8 is a perspective view of a flow path in the cutting tool illustrated in FIG. 6.

The cutting edge 41 may be located most away from the second end 3*b* on a side of the first end 3*a* of the holder 3 in the non-limiting embodiment illustrated in FIG. 7. If the cutting edge 41 is protruded while being located most away from the second end 3*b*, only a proximity of the cutting edge 41 can be brought into contact with the workpiece. The cutting edge 41 may be extended in a direction along the central axis X1, or alternatively in a direction orthogonal to the central axis X1. The cutting edge 41 may be extended in the direction orthogonal to the central axis X1 in the non-limiting embodiment illustrated in FIG. 5.

As illustrated in FIG. 3, the insert 5 may include a through hole 43 that opens into each of the pair of end surfaces 37. The through hole 43 may be extended in a direction approximately orthogonal to the first side surface 13 in the non-limiting embodiment illustrated in FIG. 3. The fixing member 45 for fixing the insert 5 to the holder 3 may be inserted into the through hole 43.

A shape of the insert 5 is not limited to a configuration illustrated in FIG. 3. For example, the pair of end surfaces 37 in the insert 5 may have a quadrangular shape or pentagonal shape. Alternatively, the insert 5 may have a bar shape extended in a direction orthogonal to the central axis X1 of the holder 3. The insert 5 having the bar shape may be called "dog bone type" in some cases.

For example, cemented carbide or cermet may be usable as a material of a member that forms the insert 5. Examples of composition of the cemented carbide may include WC—Co, WC—TiC—Co and WC—TiC—TaC—Co. The WC—Co may be produced by adding cobalt (Co) powder to tungsten carbide (WC), followed by sintering. The WC—TiC—Co may be produced by adding titanium carbide (TiC) to WC—Co. The WC—TiC—TaC—Co may be produced by adding tantalum carbide (TaC) to WC—TiC—Co.

The cermet may be a sintered composite material obtainable by compositing metal into a ceramic component. Examples of the cermet may include ones which are composed mainly of a titanium compound, such as titanium carbide (TiC) and titanium nitride (TiN).

The fixing member 45 may be the member for fixing the insert 5 to the holder 3. The fixing member 45 may be a screw in the non-limiting embodiment illustrated in FIG. 3. The fixing member 45 is not limited to the screw, but may be, for example, a clamp member. The insert 5 may include the through hole 43 as described above, and the holder 3 may include a screw hole at a position corresponding to the through hole 43 in the non-limiting embodiment illustrated in FIG. 3. The insert 5 may be fixable to the holder 3 by inserting the screw 9 into the through hole 43 of the insert 5, and by fixing the screw to the screw hole of the holder 3. The through hole 43 and the screw hole may be extended in the direction orthogonal to the central axis X1 in the non-limiting embodiment illustrated in FIG. 3.

The holder 3 may include the recess 15 in the cutting tool 1 of the present disclosure. Hence, even if chips flow to a side of the first side surface 13, the chips may be easy to flow in a space where the recess 15 is located. The chips may be therefore less likely to remain in the pocket 17. The cutting tool 1 of the present disclosure may therefore have enhanced chip discharge performance.

The second flow path 25 may be located closer to the upper surface 9 than the recess 15 in the non-limiting embodiment illustrated in FIG. 3. Therefore, a thickness of the holder 3 in between the second flow path 25 and the first side surface 13 can be further increased by an amount of a depth of the recess 15. Consequently, the cutting tool 1 of the present disclosure may have enhanced durability, thus making it possible to enhance coolant injection pressure.

The cutting edge 41 may be extended in the direction orthogonal to the central axis X1 in the non-limiting embodiment illustrated in FIG. 5. The second flow path 25 may be extended in a straight line shape along the central axis X1 in a front view of the upper surface 9 in the non-limiting embodiment illustrated in FIG. 5. In this case, a chip discharge direction may become stable. The cutting tool 1 may therefore have enhanced chip discharge performance in the non-limiting embodiment illustrated in FIG. 5.

If the second flow path 25 is extended in the straight line shape as described above, the thickness of the holder 3 in between the second flow path 25 and the first side surface 13 may tend to become small, however, the recess 15 may not open into the upper surface 9 in the cutting tool 1 in the non limiting embodiment illustrated in FIG. 9. The holder 3 is located between the second flow path 25 and is located closer to the upper surface 9 than the recess 15. The first side surface 13 may have a large thickness.

The second flow path 25 declines toward the lower surface 7 in the direction of the first end 3*a* in a front view of the first side surface 13 in the non limiting embodiment illustrated in FIG. 9. In this case, the coolant may be easy to come into contact with, for example, a rake surface in the cutting insert 5. The cutting tool 1 may have high cooling efficiency in the non limiting embodiment illustrated in FIG. 9.

The first bottom surface 19 may be parallel to or inclined relative to the reference plane S. For example, the first bottom surface 19 may come closer to the reference plane S as going toward the second end 3b. If the first bottom surface 19 is inclined as described above, a region on a side of the second end 3b in the recess 15 may have a large space. This may contribute to high chip discharge performance even if chips flow toward the first side surface 13 and advance from a side of the first end 3a toward a side of the second end 3b.

Alternatively, the first bottom surface 19 may come closer to the reference plane S as going toward the lower surface 7 as illustrated in FIG. 6. In cases where the first bottom surface 19 is inclined as described above, even if chips flow toward the first side surface 13, the chips may be easy to flow not toward the upper surface 9 but toward the lower surface 7 into which the recess 15 opens. This may lead to enhanced chip discharge performance.

The first side surface 13 may be formed by one or a plurality of flat surfaces. For example, the first side surface 13 may include a first region 13a and a second region 13b as illustrated in FIG. 1. The first region 13a may be located closer to the second end 3b than the recess 15. The second region 13b may be located closer to the upper surface 9 than the recess 15.

If the first side surface 13 includes the first region 13a and the second region 13b, the second region 13b may be located closer to the reference plane S than the first region 13a. In this case, the holder 3 may have high durability. This may be because if the holder 3 has the above configuration, the thickness of the holder 3 on a side of the second end 3b located away from the cutting edge 41 may have a large thickness. The large thickness of the holder 3 on the side of the second end 3b may contribute to reduce chatter vibration during a cutting process.

The second region 13b and the first region 13a may be parallel to each other, and the second region 13b and the first region 13a may be parallel to the reference plane S in the non-limiting embodiment illustrated in FIG. 6.

A difference between a distance from the second region 13b to the reference plane S and a distance from the first region 13a to the reference plane S may be smaller than a difference between the distance from the second region 13b to the reference plane S and a distance from the first bottom surface 19 to the reference surface S as illustrated in FIG. 6. If the second region 13b and the first region 13a have the above configuration, there may be a large space where the recess 15 is located. This may lead to enhanced chip discharge performance.

The second flow path 25 may be located closer to the upper surface 9 than the recess 15 as described above. The entirety of the second flow path 25 may be overlapped with the second region 13b in a transparent plan view of the first side surface 13. In cases where the entirety of the second flow path 25 is overlapped with the second region 13b but not overlapped with the recess 15, the thickness of the holder 3 in between the second flow path 25 and the first side surface 13 may be large over a wide range. The holder 3 may therefore have high durability.

The cutting edge 41 of the insert 5 may be more protruded toward a side away from the reference plane S than the first side surface 13 in the non limiting embodiment illustrated in FIG. 6. If the cutting edge 41 is thus located, the first side surface 13 may be less likely to come into contact with the workpiece during the cutting process. Consequently, a machined surface of the workpiece may become smooth, and the holder 3 may have high durability.

<Method for Manufacturing Machined Product>

Methods for manufacturing a machined product in non-limiting embodiments of the present disclosure may be described in detail below with reference to FIGS. 10 to 12. The method for manufacturing a machined product in the non-limiting embodiment may include the following steps (1) to (4).

Figure 10:
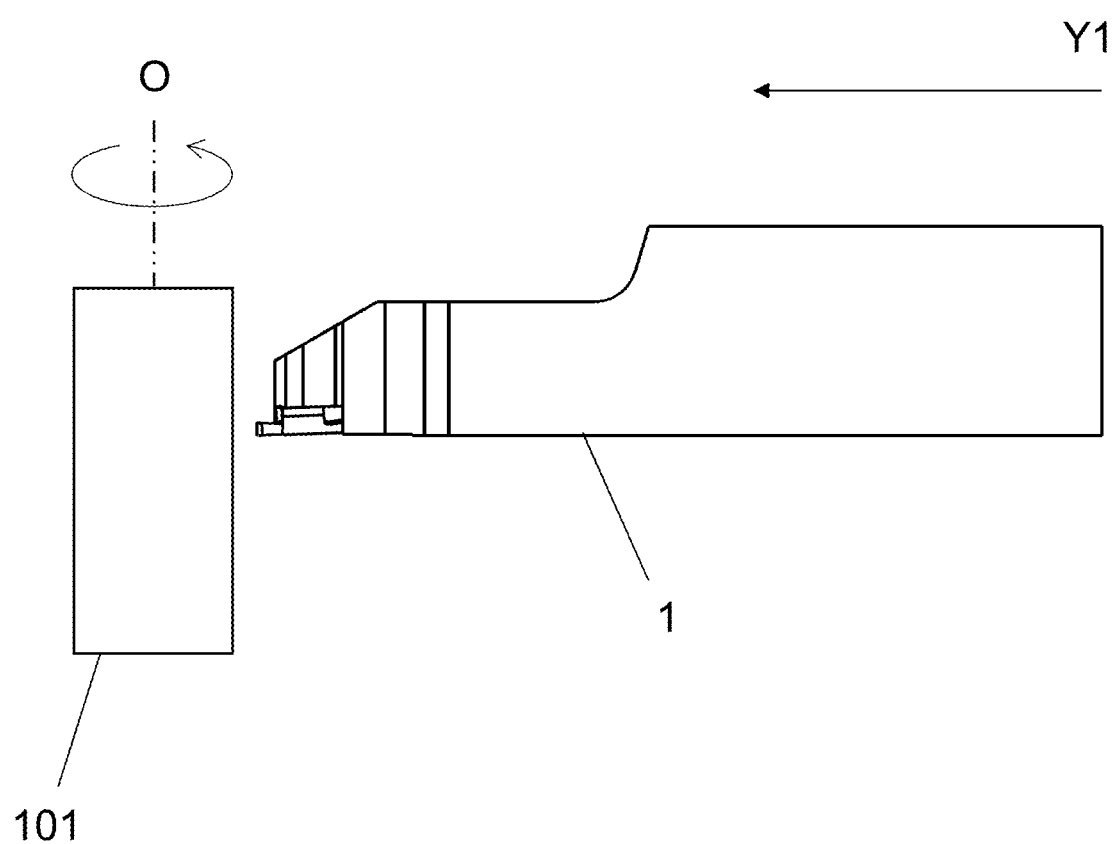
FIG. 10 is a schematic diagram illustrating one of the steps in a method for manufacturing a machined product in a non-limiting embodiment.
Figure 11:
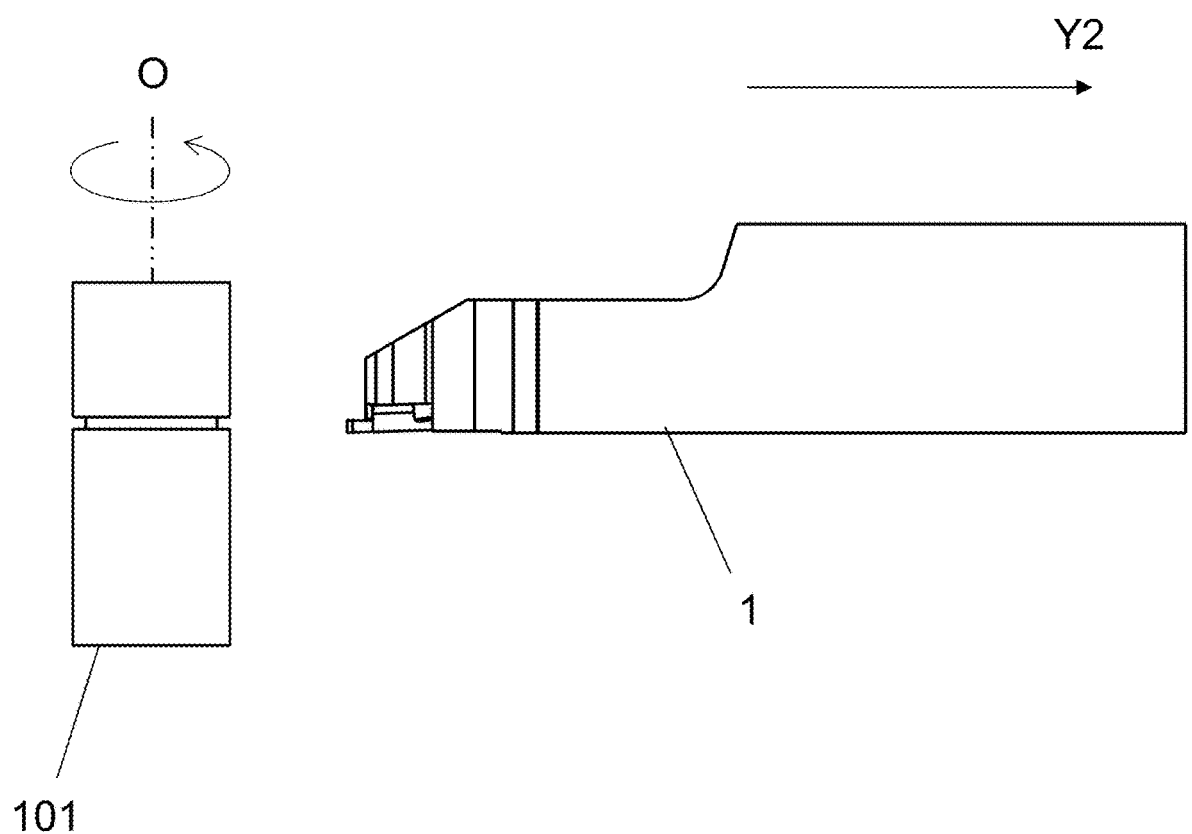
FIG. 11 is a schematic diagram illustrating one of the steps in the method for manufacturing a machined product in the non-limiting embodiment.

(1) preparing a workpiece 101 and a cutting tool 1 as illustrated in FIG. 10;
(2) rotating the workpiece 101 as illustrated in FIG. 10;
(3) bringing the workpiece 101 and the cutting tool 1 into contact with each other as illustrated in FIG. 11; and
(4) moving the workpiece 101 and the cutting tool 1 away from each other as illustrated in FIG. 12.

Specifically, examples of material of the workpiece 101 prepared in the step (1) may include carbon steel, alloy steel, stainless steel, cast iron and non-ferrous metal. In the non-limiting embodiment illustrated in FIG. 10, the above cutting tool 1 may be prepared in the step (1).

In the step (2), the workpiece 101 may be rotated on the basis of a rotation axis O thereof as illustrated in FIG. 10.

In the step (3), firstly, the cutting tool 1 may be relatively brought near the workpiece 101 being rotated by moving the cutting tool 1 in an arrowed Y1 direction. Subsequently, the cutting tool 1 may be brought into contact with the workpiece 101 being rotated as illustrated in FIG. 11. The workpiece 101 may be cut out by bringing the cutting edge of the cutting tool 1 into contact with the workpiece 101 in the non-limiting embodiment illustrated in FIG. 11. At that time, the workpiece 101 may be cut out by causing a coolant to flow out of an outflow port.

Figure 12:
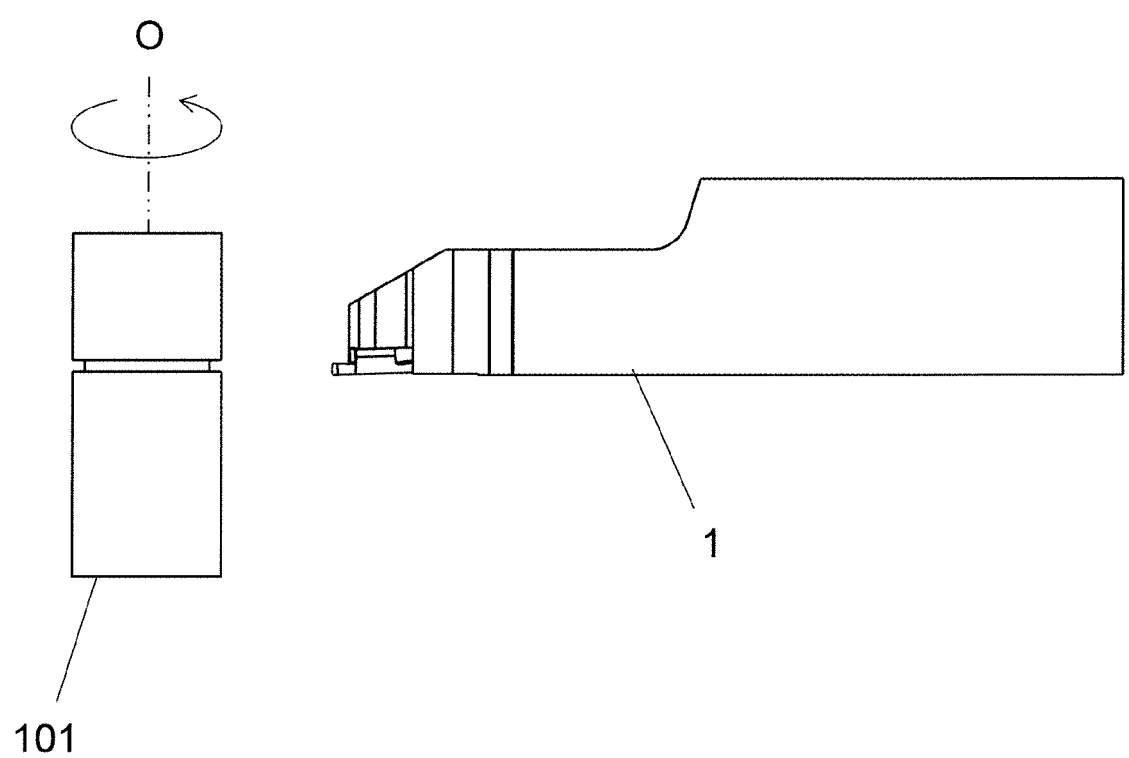
FIG. 12 is a schematic diagram illustrating one of the steps in the method for manufacturing a machined product in the non-limiting embodiment.

In the step (4), the cutting tool 1 may be moved away from the workpiece 101 by moving the cutting tool 1 in an arrowed Y2 direction, thereby obtaining a machined product as illustrated in FIG. 12.

With the method for manufacturing the machined product in the non-limiting embodiment, the use of the cutting tool 1 contributes to efficient cooling of the cutting edge and good chip discharge.

Alternatively, workpiece 101 may be brought near the cutting tool 1 in the step (3). The workpiece 101 may be moved away from the cutting tool 1 in the step (4). If it is desired to continue a cutting process, the step of bringing the cutting edge into contact with different portions of the workpiece 101 may be repeated while the workpiece 101 is kept rotating.

While the cutting tools 1 and the methods for manufacturing a machined product in the non-limiting embodiments of the present disclosure have been exemplified above, the present disclosure is not limited to the above embodiments. It may be, of course, possible to make any arbitrary ones in so far as they do not depart from the gist of the present disclosure.

For example, even though the cutting tools 1 illustrated in FIG. 1 or the like are tools for an external grooving process, it may not be intended to limit to these tools. Examples of the cutting tool may include tools for an internal grooving process and tools for an external turning process.

DESCRIPTION OF THE REFERENCE NUMERAL 1 cutting tool
3 holder 3a first end
3b second end
5 insert
7 lower surface
9 upper surface
11 first end surface
13 first side surface
13a first region
13b second region
15 recess
17 pocket
19 first bottom surface
21 second bottom surface
23 first flow path
25 second flow path
27 inflow port
29 outflow port
31 second end surface
33 second side surface
35 third flow path
37 end surface
39 side surface
41 cutting edge
43 through hole
45 fixing member
101 workpiece

The invention claimed is:

1. A cutting tool, comprising:
a holder having a bar shape extended along a central axis from a first end to a second end and comprising a pocket; and
a cutting insert located in the pocket,
the holder further comprising
an upper surface,
a lower surface located on a side opposite to the upper surface, a first end surface located between the upper surface and the lower surface and located on a side of the first end,
a first side surface located between the upper surface and the lower surface and extending from the first end to the second end,
a recess opening into the first end surface and the first side surface,
a first flow path which is located along the central axis and comprises an inflow port, and
a second flow path which is located closer to the upper surface than the recess, connects via a third flow path to the first flow path and comprises an outflow port, wherein
an imaginary plane that passes through the central axis and is orthogonal to the lower surface is a reference plane,
the recess comprises a flat bottom surface into which the pocket opens,
the pocket is formed in the recess and extends from the flat bottom surface of the recess toward the reference plane,
the first side surface comprises
a first region located between the second end and the recess and connected to the recess, and
a second region between the upper surface and the recess,
the recess separates the first end surface and a first region of the first side surface, and
the outflow port is located between the upper surface and the flat bottom surface.

2. The cutting tool according to claim 1, wherein
the second flow path is parallel to the central axis in a side view of the upper surface, and
the second flow path declines toward the lower surface in the direction of the first end in a side view of the first side surface.

3. The cutting tool according to claim 1, wherein the flat bottom surface inclines toward the reference plane in the direction of the second end.

4. The cutting tool according to claim 1, wherein the flat bottom surface inclines toward the reference plane in the direction of the lower surface.

5. The cutting tool according to claim 1, wherein the second region is located closer to the reference plane than the first region.

6. The cutting tool according to claim 5, wherein a difference between a distance from the first region to the reference plane and a distance from the second region to the reference plane is smaller than a difference between a distance from the recess to the reference plane and the distance from the second region to the reference plane.

7. The cutting tool according to claim 5, wherein the second region is parallel to the reference plane.

8. The cutting tool according to claim 1, wherein
the cutting insert comprises a cutting edge, and
the cutting edge extends in a direction away from the reference plane so as to protrude from the first side surface.

9. A method for manufacturing a machined product, comprising:
rotating a workpiece;
bringing the cutting tool according to claim 1 into contact with the workpiece being rotated; and
moving the cutting tool away from the workpiece.

10. A cutting tool, comprising:
a holder having a bar shape extended along a central axis from a first end to a second end and comprising a pocket; and
a cutting insert located in the pocket,
the holder further comprising
an upper surface,
a lower surface located on a side opposite to the upper surface,
a first end surface located between the upper surface and the lower surface and located on a side of the first end,
a first side surface located between the upper surface and the lower surface and extending from the first end to the second end,
a recess opening into the first end surface and the first side surface,
a first flow path which is located along the central axis and comprises an inflow port, and
a second flow path which is located closer to the upper surface than the recess, fluidly connects to the first flow path and comprises an outflow port, wherein
an imaginary plane that passes through the central axis and is orthogonal to the lower surface is a reference plane,
the recess comprises a flat bottom surface into which the pocket opens,
the pocket is formed in the recess and extends from the flat bottom surface of the recess toward the reference plane,
the first side surface comprises
a first region located between the second end and the recess and connected to the recess, and a second region between the upper surface and the recess, the recess separates the first end surface and a first region of the first side surface, and the outflow port is located between the upper surface and the flat bottom surface.

11. The cutting tool according to claim 10, wherein the second flow path is parallel to the central axis in a side view of the upper surface, and the second flow path declines toward the lower surface in the direction of the first end in a front side view of the first side surface.

12. The cutting tool according to claim 10, wherein the flat bottom surface inclines toward the reference plane in the direction of the second end.

13. The cutting tool according to claim 10, wherein the flat bottom surface inclines toward the reference plane in the direction of the lower surface.

14. The cutting tool according to claim 10, wherein the second region is located closer to the reference plane than the first region.

15. The cutting tool according to claim 14, wherein a difference between a distance from the first region to the reference plane and a distance from the second region to the reference plane is smaller than a difference between a distance from the recess to the reference plane and the distance from the second region to the reference plane.

16. The cutting tool according to claim 14, wherein the second region is parallel to the reference plane.

17. The cutting tool according to claim 10, wherein the cutting insert comprises a cutting edge, and the cutting edge extends in a direction away from the reference plane so as to protrude from the first side surface.

18. A method for manufacturing a machined product, comprising:

rotating a workpiece;

bringing the cutting tool according to claim 10 into contact with the workpiece being rotated; and moving the cutting tool away from the workpiece.

\* \* \* \* \*